(12) United States Patent
White et al.

(10) Patent No.: US 6,317,496 B1
(45) Date of Patent: Nov. 13, 2001

(54) TELEPHONE KEYPAD GUARD

(76) Inventors: William W. White, 10002 Rio Bravo, Houston, TX (US) 77064; David E. Grudzinski, 1 Windsong La., Friendswood, TX (US) 77546

( * ) Notice: Subject to any disclaimer, the term of this patent is extended or adjusted under 35 U.S.C. 154(b) by 0 days.

(21) Appl. No.: 09/488,943

(22) Filed: Jan. 21, 2000

(51) Int. Cl.[7] ....................................................... H04M 1/00
(52) U.S. Cl. ........................ 379/451; 379/143; 379/144; 379/145; 379/155; 379/428; 379/437
(58) Field of Search ..................................... 379/143–145, 379/155, 428, 437, 451

(56) References Cited

U.S. PATENT DOCUMENTS

| | | | |
|---|---|---|---|
| 4,160,136 | * | 7/1979 | McGough .............................. 379/368 |
| 4,555,600 | * | 11/1985 | Morse ................... 200/5 A |
| 5,134,654 | | 7/1992 | McGough . |
| 5,148,476 | | 9/1992 | Zausner . |
| 5,155,765 | | 10/1992 | McGough . |
| 5,509,057 | | 4/1996 | Anello . |
| 5,802,171 | * | 9/1998 | Deutsch ............................... 379/419 |

* cited by examiner

*Primary Examiner*—Curtis Kuntz
*Assistant Examiner*—Barry W Taylor
(74) *Attorney, Agent, or Firm*—Keeling Law Firm

(57) ABSTRACT

This invention is a guard for preventing the vandalism of the keypad of a telephone. If the telephone is a pay telephone, the invention further prevents, thus preventing entry into the telephone money box from the upper housing area. The telephone guard, composed of an upper housing guard and a keypad guard, is secured by high strength visible fasteners to the upper housing of a pay telephone. The upper housing guard and keypad guard are mated tightly to prevent vandals from prying off the keypad guard. The thickness of the keypad guard is greater than the throw length of the push buttons of the keypad. Thus, the force of a blow to the keypad will be absorbed by the front of the guard rather than the push buttons.

7 Claims, 3 Drawing Sheets

TELEPHONE KEYPAD GUARD

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of Invention

This invention relates generally to a guard that prevents the destruction and vandalism of the keypad of a telephone. Specifically, this invention is a keypad guard mated into an upper housing guard to form a telephone guard for a telephone upper housing. The keypad guard is of sufficient strength to prevent damage to the telephone keypad, and prevents access to the money in a coin vault of a pay telephone via an opening created by destruction of the keypad.

Over a prolonged period of time, a large amount of coin money is retained within the vault of a pay telephone. Due to their normally isolated and unprotected location, pay telephones are the subject of frequent vandalism attempts. Vandals use a variety of means to gain access to the pay telephone vaults, including smashing through the keypad, which is typically positioned within the pay telephone directly above the open-top coin vault drawer. The present invention is directed to preventing vandalism to the telephone keypad, and to preventing access to money in the pay telephone coin vault by protecting the keypad assembly.

2. Related Art

Several inventions aimed to prevent the vandalism of pay telephone keypads are known to the prior art. Illustrative of such inventions are U.S. Pat. No. 5,509,057 issued to Anello and U.S. Pat. No. 4,160,136 issued to McGough. Both patents teach the use of embossed mini-housings around each push button of the keypad. McGough requires retrofitting the keypad with L-shaped buttons that afford a smaller side surface area to minimize lateral force from a detrimental source. Anello teaches the use of full length and width double face plates, which adds additional weight and cost of material to the pay telephone without affording significant additional keypad protection over a standard face plate.

Other prior art known in the field of guarding pay telephones includes single piece face plates. Prior art face plates are typically made of light metal or heavy plastic, which affords minimal security protection to the telephone.

It would thus be beneficial to the prior art to provide a telephone keypad guard constructed of high strength material that prevents a vandal from damaging the telephone keypad, and from smashing out the keypad to gain access to the money in the pay telephone coin vault.

The prior art would also benefit from a keypad guard that is relatively inexpensive, simple to manufacture, has a secure exterior appearance and requires minimal retrofitting of the existing pay telephone.

BRIEF SUMMARY OF THE INVENTION

Accordingly, the objectives of this invention are to provide, inter alia, a new and improved telephone keypad guard that:

protects the telephone keypad from striking blows or other vandalism;

prevents a vandal from smashing through the keypad to gain access to money in the coin vault;

is relatively inexpensive and simple to manufacture;

requires no retro-fitting of the pay telephone keypad; and can be installed quickly and easily.

These objectives are accomplished by the structure and use of the inventive telephone guard, composed of an upper housing guard and a keypad guard, both of which are mated and secured by high strength visible fasteners to the upper housing of a telephone. A first critical feature of the invention is the close inset mating of the upper housing guard and the keypad guard, which prevents prying off the keypad guard. A second critical feature of the telephone guard is the thickness of the keypad guard. Each push button of the keypad has a throw distance, defined as the distance required to depress the keypad push button until an associated electrical switch is engaged, thus completing the electrical circuit signaling the entry of the number or function associated with the keypad push button. In the prior art, keypad push buttons are oriented such that their throw distance is reached before the keypad push button front face recedes beyond the face of the faceplate cover. In the present invention, the thickness of the keypad guard is such that the keypad push button is fully depressed only when it is flush with the keypad guard. The keypad guard alignment prevents damage to the keypad push buttons and their associated electrical switches when struck by excessive force. This damage protection further prohibits access to the interior of the telephone and money in the coin vault.

Other objects of the invention will become apparent from time to time throughout the specification hereinafter disclosed.

DETAILED DESCRIPTION OF THE INVENTION

Figure 1:
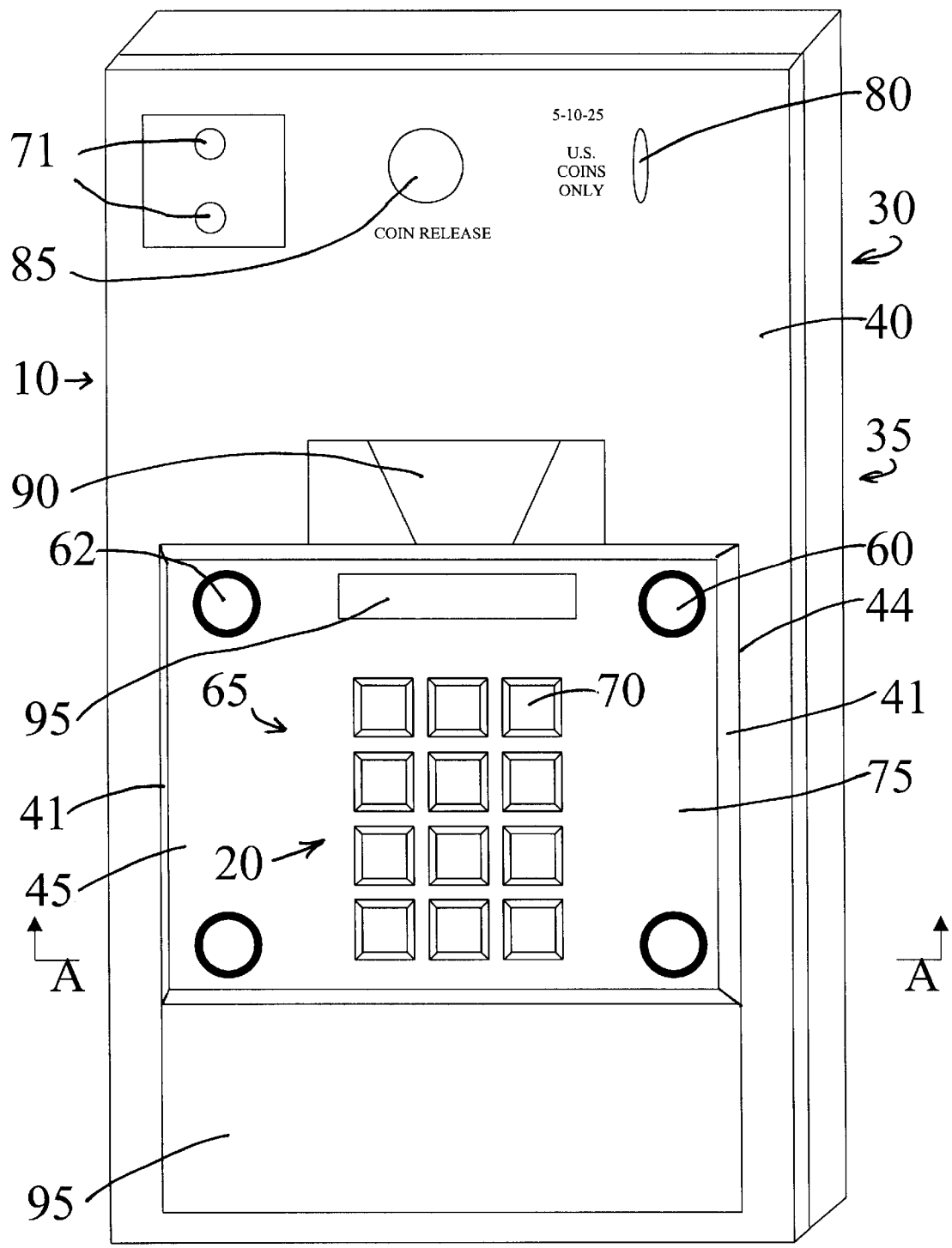
FIG. 1 is an isometric view of the telephone guard secured to the upper housing of a pay telephone.

The invention is shown in FIGS. 1–4 generally as telephone guard 10. FIG. 1 illustrates telephone guard 10 attached to prior art pay telephone upper housing 35. Telephone guard 10 includes upper housing guard 40, made from a first flat plate, typically high strength stainless steel or similar strength metal, having the same general planar dimensions as the front face of upper housing 35, and keypad guard 45, made from a second smaller flat plate, also typically high strength stainless steel or similar strength metal. Alternatively, telephone guard 10 can be constructed of a non-metallic high strength material capable of being attached to upper housing 35 as described herein. In either embodiment, the material from which telephone guard 10 is constructed should be of sufficient strength and thickness to protect against heavy striking blows from vandals.

Figure 2:
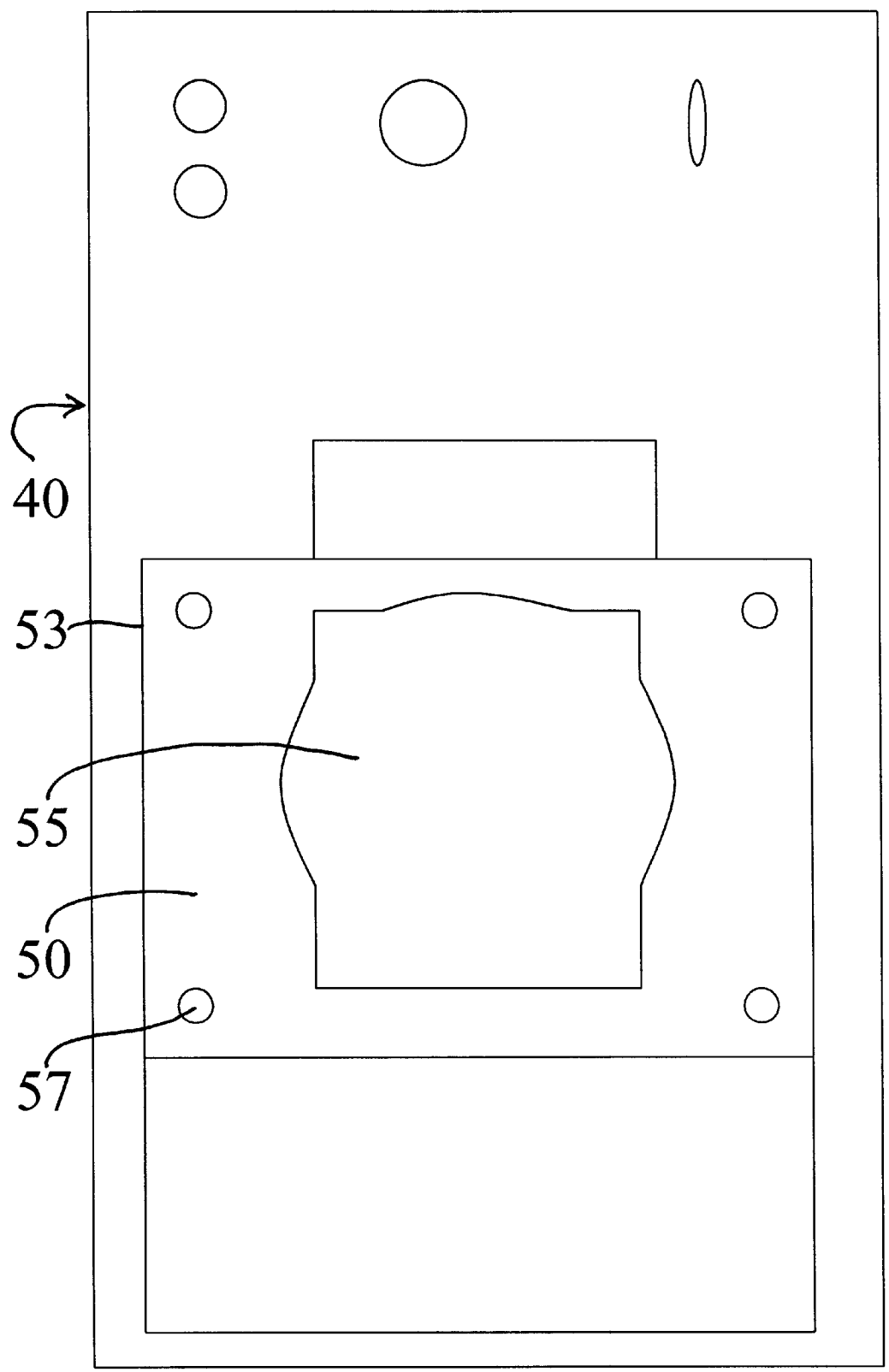
FIG. 2 is a front view of the upper housing guard and keypad with the keypad guard removed.
Figure 3:
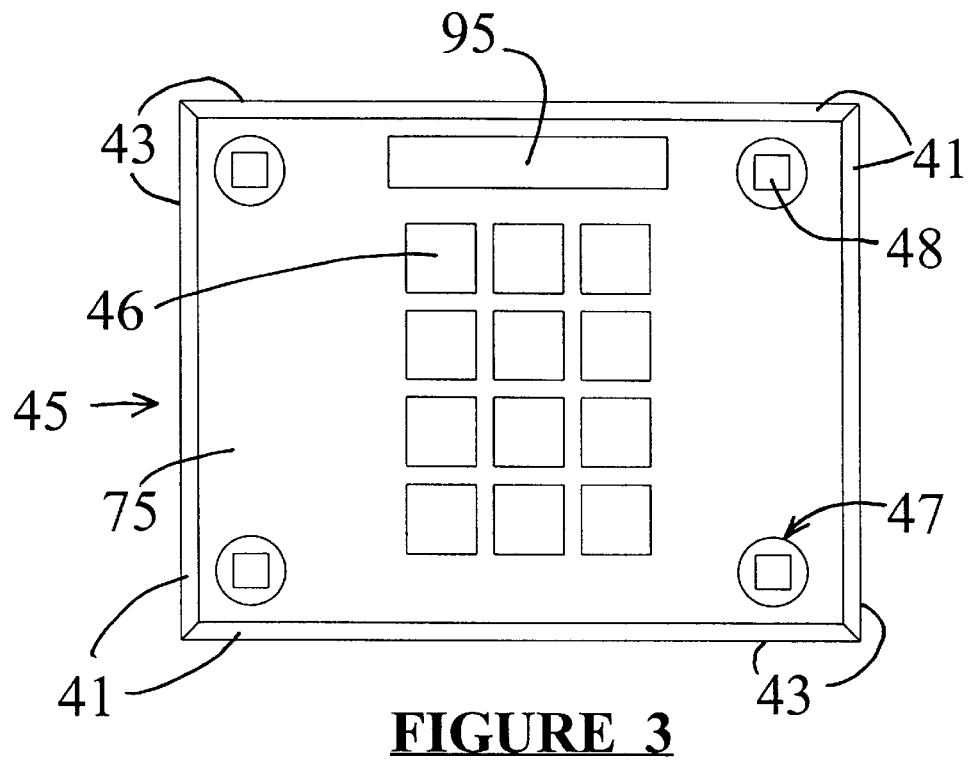
FIG. 3 is a front view of the keypad guard.

Upper housing guard 40 and keypad guard 45 are shown separately in FIGS. 2 and 3 respectively.

Telephone guard 10 includes cavities affording access to functional components of telephone 30. These functional components include coin payment slot 80, volume control cavities 71, coin return lever 85, handset cradle 90 and dialing information panels 95. Telephone guard 10 also includes cavities affording access to keypad 20, comprising a plurality of keypad push buttons 65.

Telephone guard 10 provides protection for keypad 20 through the mating of upper housing guard 40 and keypad guard 45. Upper housing guard 40 is secured to upper housing 35 by a secure form of attachment known in the art of mechanical assembly. For example, upper housing guard 40 may be welded to the front face (not shown) of upper housing 35. Alternatively, upper housing guard 40 may be bolted to the front face of upper housing 35 with nuts positioned in the interior (not shown) of upper housing 35, said nuts securing threaded or self-threading studs, bolts, machine screws or similar mechanical fasteners. Typically, upper housing guard 40 is secured to the front face of upper housing 35 with twelve threaded or self-threading studs of 1/8" diameter and 1/2" length projecting from upper housing guard 40 through upper housing 35.

FIG. 2 shows upper housing guard 40, including recessed section 50. Recessed section 50 includes a plurality of passage holes 57, which align with attachment holes (not shown) in the front face of upper housing 35. FIG. 3 depicts keypad guard 45 having a plurality of fastener insets 47, preferably at least four.

Fastener insets 47 may be countersunk circles, or in the preferred embodiment, square holes concentric with countersunk circles to secure carriage bolts used as visible fastener 60. Visible fasteners 60 are externally visible to convey an appearance of structural substance, in order to deter vandalism. Visible fasteners 60 may be carriage bolts, flat face security screws or other similar high strength fasteners. In the preferred embodiment, visible fasteners 60 are oversized at 3/16" nominal diameter.

Figure 4:
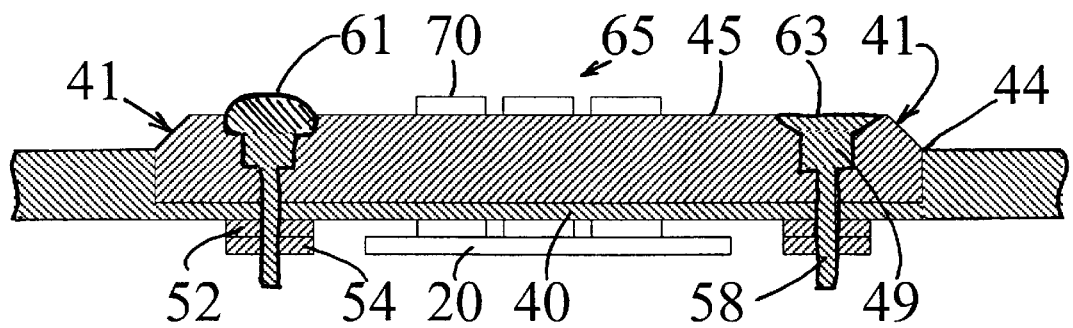
FIG. 4 is a partial cross sectional view along cross section A shown in FIG. 1 of the keypad guard of the present invention.

In the preferred embodiment, visible fasteners 60, as shown in cross section in FIG. 4, are carriage bolts 61 or flat top bolts 63, each having square bolt shaft sections 49 and round shaft sections 58. Carriage bolts 61 are used to provide the visual evidence of the security strength of visible fasteners 60. Flat top bolts 63 provide the same appearance in a slightly modified form for typically indoor use. Both carriage bolts 61 and flat top bolts 63 shown in FIG. 4 resist shaft rotation during tightening through the mating of concentric square holes 48 and square bolt shaft sections 49, as shown in FIG. 3 and FIG. 4. In the preferred embodiment, each visible fastener 60 includes a visible fastener head 62, round shaft section 58, square bolt shaft section 49, standard nut 52 and self locking nut 54. Visible fastener heads 62 seat in fastener insets 47. The seating may be such that the top of visible fastener head 62 is flush, inset or superior to keypad guard front face 75. In the preferred embodiment, the seating is inset, as shown in FIG. 4. The shaft of visible fasteners 60 axially traverse through passage holes 57 and the aligned attachment holes in the front face of upper housing 35. In an alternative embodiment, the shaft of visible fasteners 60 may extend through central cavity 55 of upper housing guard 40 to connect through the attachment holes in the front face of upper housing 35.

The shaft is secured within the interior of upper housing 35 with standard mechanical hardware, typically nuts. In the preferred embodiment depicted in FIG. 4, round shaft sections 58 are secured first by standard nut 52 and then self-locking nut 54, to prevent removal of visible fasteners 60. Thus, keypad guard 45 further secures upper housing guard 40 to the face of upper housing 35. This provides an additional plurality of oversized fasteners securing upper housing guard 40 to upper housing 35.

Within recessed section 50 is central cavity 55, which affords axial passage of keypad 20 and plurality of keypad push buttons 65 through upper housing 35 and through keypad guard 45. Keypad guard 45 includes a plurality of push button cavities 46, typically twelve in number aligned in four rows of three each. Central cavity 55 is aligned behind plurality of push button cavities 46, affording passage to the plurality of keypad push buttons 65 from upper housing 35.

A critical feature of telephone guard 10 is the mating of recessed section 50 of upper housing guard 40 and keypad guard 45. To prevent a vandal from prying off keypad guard 45, keypad guard 45 and recessed section 50 must be closely matched in shape. Typically, both keypad guard 45 and recessed section define a similar shape. Recessed section 50 further defines recessed section inner perimeter 53. Keypad guard 45 further defines keypad guard outer perimeter 43. Keypad guard outer perimeter 43 is uniformly slightly smaller than recessed section inner perimeter 53, such that gap 44 is defined between keypad guard outer perimeter 43 and recessed section inner perimeter 53. Gap 44 is preferably no greater than 1/64 inch. The small size of gap 44 prevents the insertion of a prybar or similar tool from being inserted into gap 44, which would afford a vandal adequate leverage to pry off keypad guard 45. To further prevent in the alternative embodiment, keypad guard 45 has beveled edges 41, to prevent lateral blows from damaging or knocking off keypad guard 45.

Another critical feature of telephone guard 10 is the thickness of keypad guard 45. Keypad guard 45 is of sufficient thickness and strength to prevent smashing of keypad push buttons 65 and keypad 20. Further, each keypad push button 65 has a throw distance, defined as the distance required to depress keypad push button 65 until an associated electrical switch is actuated, thus completing the information electric circuit signaling the entry of the number or function of keypad push button 65. In the prior art, keypad push buttons 65 are oriented such that their throw distance is reached before keypad push button front face 70 recedes beyond the face of the keypad grid cover. In the present invention, the thickness of keypad guard 45 is of a sufficient dimension such that, when keypad guard 45 is mated with recessed section 50 to define a mated thickness, keypad push button front face 70 is flush with keypad guard front face 75 when the throw distance has been reached to engage the mechanism of each keypad push button 65 as described above. This alignment prohibits damage to keypad push buttons 65 and their associated electrical switch when struck frontally by a heavy blow to keypad guard 45. This damage protection further prohibits access to the interior of upper housing 35 of telephone 30 and the coin vault (not shown). Vandals are unable to smash keypad 20 with a hammer or like heavy instrument normally used when trying to gain illicit access to a coin vault. This prevents deforming of the internal workings of keypad 20, and so passage to the interior of telephone 30 remains blocked. Further, plurality of keypad push buttons 65 remain within push button cavities 46, and keypad guard 45 remains resistant to instrument picking and striking attacks.

In the preferred embodiment, the thickness of keypad guard 45 is greater than the depth of recessed section 50. As depicted in the cross section 4 in FIG. 4, keypad guard 45 has beveled edges 41, creating a sloped face above upper housing guard 40, preventing leveragable prying points which would damage the keypad guard 45 from a chisel or similar destructive device.

In an alternative embodiment, keypad guard 45 can be secured to upper housing 35 by drilling holes directly through an existing prior art single piece face plate into upper housing 35, and securing keypad guard 45 to upper housing 35 with mechanical fasteners or similar fastening means. Typically, the prior art single piece face plate is secured to upper body housing 35 by a plurality of self-threading studs, typically twelve in number. In this embodiment, the keypad guard 45 must be sufficiently thin to allow full travel of plurality of keypad push buttons 65 as described above, when keypad guard 45 is laid over the existing prior art single piece face plate, yet still sufficiently thick to afford the protection to plurality of keypad push buttons 65 described above.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

We claim:

1. A telephone guard for preventing vandalism to a keypad of a telephone having an upper housing, said telephone guard comprising:

an upper housing guard and a keypad guard;

said upper housing guard comprising a first plate;

said upper housing guard being fastened to said telephone upper housing;

said upper housing guard further including a recessed section;

said recessed section having a recessed section length, width and depth;

said recessed section including a central cavity for said keypad;

said keypad guard comprising a second plate having a keypad guard length, a keypad guard width and a keypad guard thickness;

said keypad guard length being slightly smaller than said recessed section length, said keypad guard width being slightly smaller than said recessed section width, and said keypad guard thickness being greater than said recessed area depth;

said keypad guard including a plurality of small cavities providing access for a plurality of keypad push buttons;

said keypad guard being mated with said recessed section;

each of said keypad push buttons having a front face, said keypad guard having a front face;

said upper housing guard having a recessed section thickness at such recessed section;

said keypad guard and said recessed section thickness defining a mated thickness;

said mated thickness being sufficiently thin to allow actuation of said each of said keypad push buttons; and said mated thickness being sufficiently thick such that said keypad guard front face is flush with said front face of each of said keypad push buttons when said each of said keypad push buttons is fully depressed;

said keypad guard having a key guard perimeter;

said keypad guard beveled proximate said key guard perimeter;

said key guard perimeter having a key guard perimeter thickness; and said key guard perimeter thickness substantially equal to said recessed area depth.

2. A telephone guard as in claim 1, wherein:

said recessed section having an inner perimeter;

said keypad guard and said recessed section mating define a gap between said inner perimeter and said perimeter; and said gap being less than 1/64".

3. A telephone guard as in claim 1, said upper housing guard including a plurality of cavities providing access for a coin payment slot, a coin return lever, a telephone handset cradle and dialing information panels.

4. A telephone guard as in claim 1, wherein said keypad guard secured by a plurality of externally visible fasteners to said upper housing guard and said telephone upper housing, said plurality of externally visible fasteners traversing through said second plate through a plurality of passage holes in said recessed section.

5. A telephone guard as in claim 4, wherein each of said plurality of externally visible fasteners have a visible fastener head, said visible fastener head being mated with a fastener inset in said small flat plate.

6. A telephone guard as in claim 5, wherein each of said plurality of externally visible fasteners have a square bolt shaft section, said square bolt shaft section mated with a concentric square hole of said fastener inset.

7. A telephone guard as in claim 6, wherein said externally visible fasteners are secured with a standard nut and a self-locking nut.

\* \* \* \* \*